United States Patent [19]

Utoh et al.

[11] Patent Number: 4,616,764

[45] Date of Patent: Oct. 14, 1986

[54] CASE HAVING SNAP-ON COVER

[75] Inventors: Yoshihiro Utoh; Shinichi Shibata, both of Hino; Hiroyuki Kitahara, Yokohama, all of Japan

[73] Assignee: Kabushiki Kaisha Toshiba, Tokyo, Japan

[21] Appl. No.: 803,735

[22] Filed: Dec. 2, 1985

[30] Foreign Application Priority Data

Nov. 30, 1984 [JP] Japan .................................. 59-251555

[51] Int. Cl.4 ...................... B65D 41/16; B65D 41/18
[52] U.S. Cl. .................................... 220/306; 220/307
[58] Field of Search .......................... 220/3.8, 306, 307; 174/67

[56] References Cited

U.S. PATENT DOCUMENTS 4,431,114 2/1984 Kleinfeld ............................. 220/306
4,493,433 1/1985 Sideri et al. ......................... 220/306
4,541,538 9/1985 Swetnam ............................. 220/306

Primary Examiner—George T. Hall
Attorney, Agent, or Firm—Finnegan, Henderson, Farabow, Garrett & Dunner

[57] ABSTRACT

The main body of a case is formed with a concave portion where a cover is detachably mounted. Engaging members are provided at the opposite edges of the cover and the opposite side walls of the concave portion so as to prevent the cover from moving away from the concave portion and positioning members are provided at one edge of the cover and near the one side wall of the concave portion so as to prevent the cover from moving toward the other side wall of the concave portion.

7 Claims, 10 Drawing Figures

CASE HAVING SNAP-ON COVER

BACKGROUND OF THE INVENTION

1. Field of the Invention

The present invention relates to a case having a cover, and more particularly to a mounting structure of the cover employed in the case.

2. Description of the Prior Art

A modern telephone has been developed to be multi-functional. As a result, in a panel of a main body of the case in such modern telephone, in addition to a set of dial keys and function keys, there are provided; a set of quick-dial keys; a memory key; and further there is provided a set of name plates in which a set of names of subscribers to be called, for example; names registered in the quick-dial keys, are to be entered. Further, on an upper portion of the main body in which the name plates are provided, there is provided a transparent cover. Since the names of the subscribers to be called are different in each of the users of the telephone set, it is necessary for the users to write such names on the name plates by themselves. Consequently, such cover should be mounted on the main body in an easily detachable manner.

In a main body of a conventional case, in order to mount such transparent cover in a detachable manner, there is provided a concave portion which receives the cover, each of the opposite side walls thereof being provided with a pair of holes, while each of the opposite side edges of the cover is provided with a pair of projections which corresponds to the pair of the holes of the concave partion of the main body. Mounting of the cover on the main body is carried out as follows: namely, the projections of one of the opposite side edges of the cover are inserted into the corresponding holes of the side walls of the concave portion of the main body, and then with the use of resiliency which the cover has the projections of the other side edge of the cover are inserted into the holes of the other side wall of the concave portion.

The back side of the cover thus mounted is supported by abutting surfaces of the bottom of the concave portion of the main body, while the cover is prevented from separated from the bottom of the concave portion by its projections having been inserted into the holes of the main body. The cover is also prevented from moving in directions parallel to the bottom surface of the concave portion because its edges are abutted against the walls of the concave portion of the main body.

However, such a conventional cover mounting structure has a following problem:

As described above, the cover is mounted on the main body by inserting the projections of one of its opposite side edges into the holes of one of the side walls of the concave pertion and then inserting its remaining projections of the other side edge into the remaining holes of the main body, thus the cover is firmly mounted on the main body by the resiliency of the cover. In order for the cover to be able to be firmly mounted on the concave portion of the main body, distance between the opposite side walls of the concave portion of the main body (referred as L) must be larger than the width of the cover (referred as l), but smaller than a sum of the above width l of the cover and a projecting height of the shortest one of the projections provided on the side edges of the cover (referred as m).

Further, since the resiliency of the cover is utilized in mounting the cover on the main body, it is necessary to set an inserted length (l+m−L) (that is, the width of the cover plus the height of the shortest projection minus the distance between the opposite walls of the concave portion) of the projection within a value determined by considering the restriction of the resiliency of the cover. Thus, in practice it is preferable to minimize this inserted length. However, if the inserted length is too short, it is impossible to firmly mount the cover on the main body, or wear of the projections caused by repetition of mounting/detaching operations will eventually make it impossible to firmly mount the cover on the main body. On the contrary, when the inserted length is too large, the cover and/or the main body are deformed beyond their elastic limit to cause permanent deformation of even breakdown. Particularly, in case that a transparent resin is employed as the material for the cover, and different material is employed for the main body, and these materials are largely different from each other in their linear thermal expansion coefficients, the inserted length is varied by an ambient operating temperature.

Suppose now that the ambient operating temperature varies in a range of from −20° to +60° C.; the main body is made of polystyrene resin (linear expansion coefficient $\alpha = 10.2 \times 10^{-5}/°C.$); the cover is made of polycarbonate resin (linear expansion coefficient $\beta = 5.4 \times 10^{-5}/°C.$); and widths of cover and concave portion are 100 mm (i.e., L=l=100 mm), then the variation in the inserted length is 0.4 mm at maximum.

SUMMARY OF THE INVENTION

It is an object of the present invention to provide a structure of mounting a cover on the main body of a case in a steady manner, in which the inserted length of the projections of the cover into the holes provided on the main body is independent of the sizes of the main body and the cover, and also independent of the variation in the ambient operating temperature even when the cover is made of a material whose liner thermal coefficient is different from that of the main body, so that the cover can be firmly mounted on the main body.

To accomplish the above object, a sructure for mounting a cover to a concave portion of the main body of a case comprises first engaging means for preventing one edge of the cover from moving away from one side wall of the concave portion; second engaging means for preventing another edge of the cover opposing to the one edge from moving away from another side wall of the concave portion opposing to the one side wall; and positioning means for preventing, in the vicinity of the another side wall of the concave portion, the cover from moving toward the one side wall of the concave portion.

DESCRIPTION OF THE PREFERRED EMBODIMENTS

Figure 1:
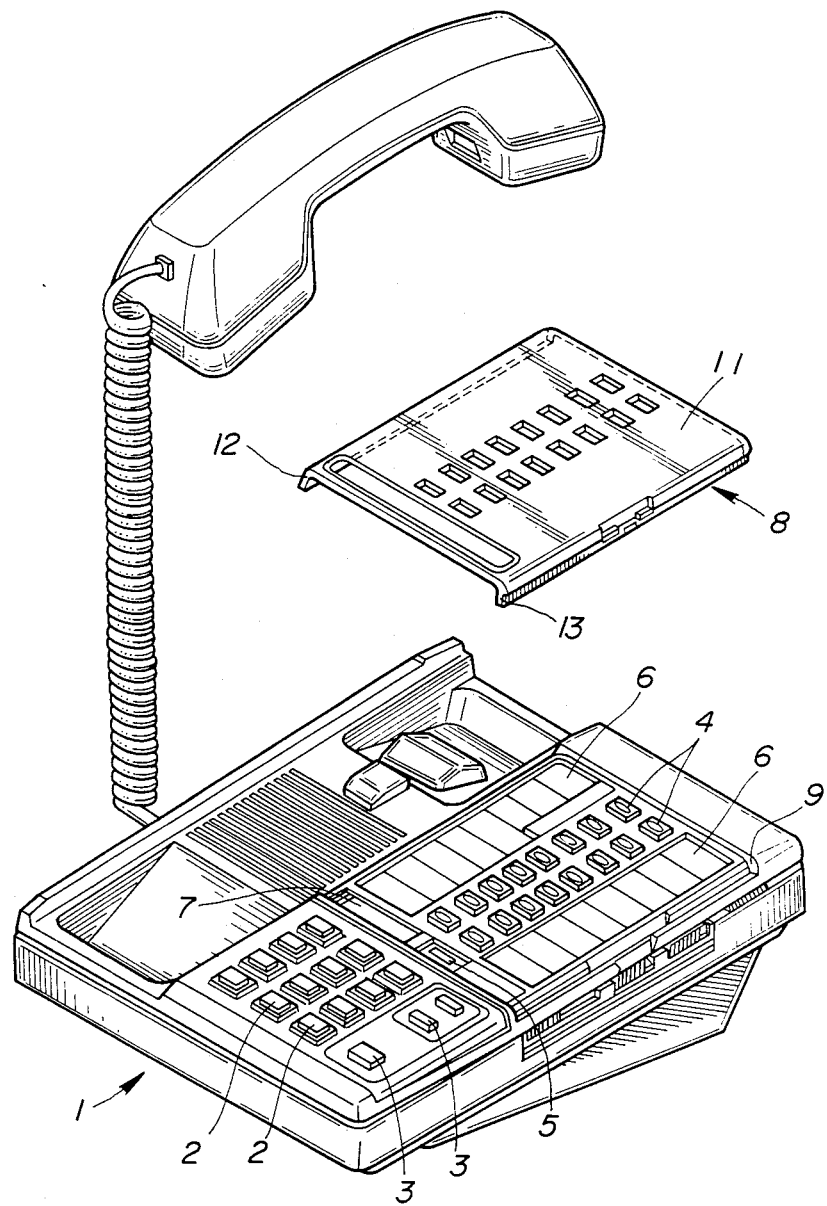
FIG. 1 is a perspective view of a telephone set to which the present invention is applied.

In a panel surface of a telephone set shown in FIG. 1, there are provided: a set of dial keys 2; a set of function keys 3; a set of quick-dial keys 4; a memory key 5; and further there are provided a set of name plates 6 in which the names of subscribers to be called set in the quick-dial keys 4 are to be entered; and a name plate 7 on which the name of the owner of the telephone set is to be entered. On the panel surface in which the name plates 6, 7 and the memory key 5 are provided is covered by a transparent cover 8 as will be described in detail hereinbelow.

Figure 2:
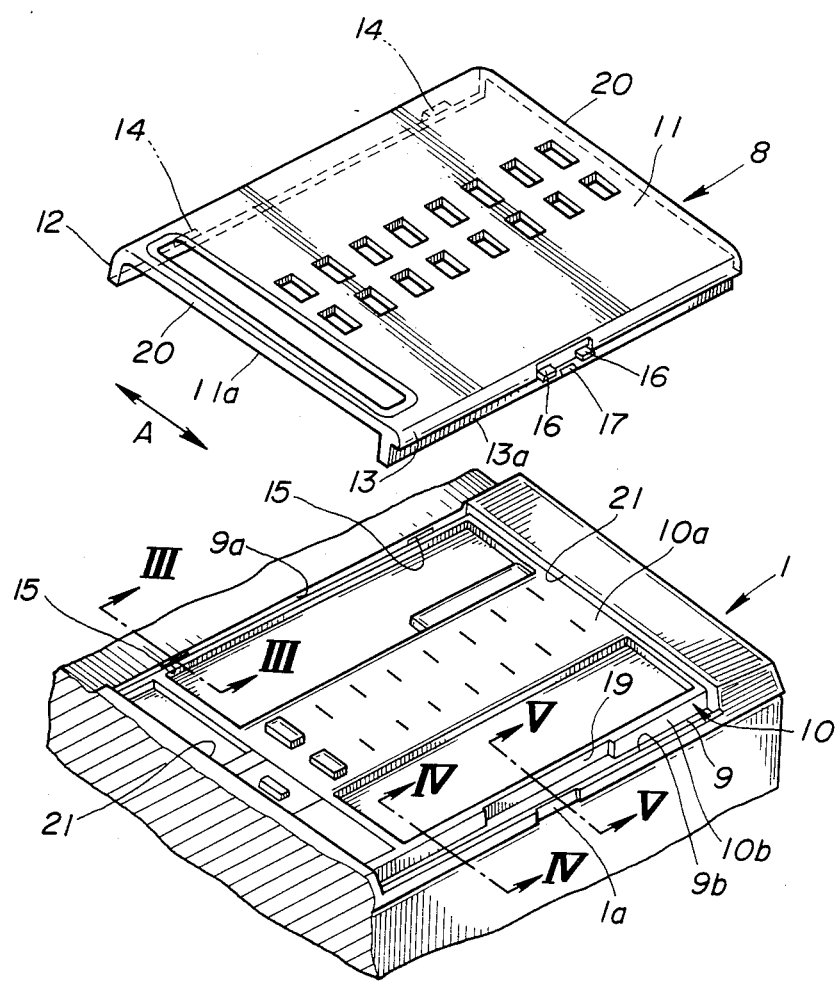
FIG. 2 is a perspective view of an essential a cover and a concave portion of the main body of the telephone set according to one embodiment of the present invention.

Referring to FIG. 2, a main body 1 is formed with a concave portion 9 of the main body 1 which is covered by the cover 8. In an inside of the concave portion 9, there is formed a base portion 10. The cover 8 comprises a ceiling 11 which is disposed in parallel to the panel surface of the main body 1 and side walls 12, 13. The cover 8 placed over the concave portion 9 of the main body 1 is supported by an upper surface 10a of the base portion 10 of the main body 1 at a back surface 11a of the ceiling 11 in abutting manner. Further, on the cover 8, there are provided two projections 14 in its side wall 12. Corresponding to the projections 14 of the cover 8, there are formed holes 15, into which the projections 14 are inserted, in a side wall 9a of the concave portion 9 of the main body 1. The projections 14 of the cover 8 and the holes 15 of the main body 1 constitute a first engaging means.

The other side wall 13 of the cover 8, which is opposite to the side wall 12, is provided with two projections 16 in a center portion of its upper outer surface. The lower surface 13a of the side wall is made thinner and between two projections 16 there is formed a nail 17 at the lower end. Further, a gap is provided between the side wall 9b of the concave portion 9 and the side wall 10b of the base portion 10 so that the side wall 13 of the cover 8 can be inserted thereinto.

The side wall 10b of the base portion 10, the side wall 9b of the concave portion 9 and the side wall 13 of the cover 8 constitute a positioning means. Further, in the side wall 9b of the concave portion 9, a recess 18 (see FIG. 5) is formed in a position with which the nail 17 of the cover 8 is engaged when the cover 8 is mounted on the main body 1. In a portion of the side wall 10b of the base portion 10, which portion is opposite to the recess 18, there is formed a recessed portion 19. The nail 17 and the recess 18 constitute a second engaging means. The outer wall of the main body 1 is formed with a recess 1a at a position corresponding to the projections 16 so as to make easy to remove the cover 8 by fingers.

Figure 3:
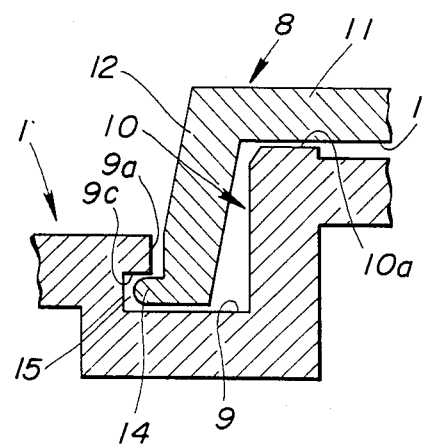
FIG. 3 is a cross-sectional view taken along the line III—III of FIG. 2, in which the cover is mounted on the main body.
Figure 4:
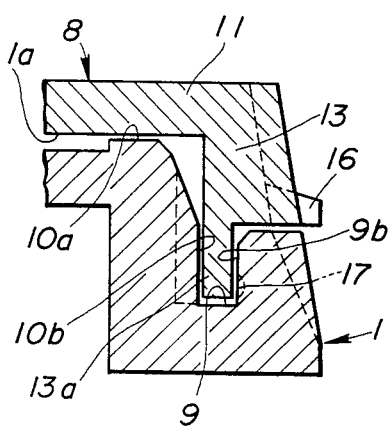
FIG. 4 is a cross-sectional view taken along the line IV—IV of FIG. 2, in which the cover is mounted on the main body.
Figure 5:
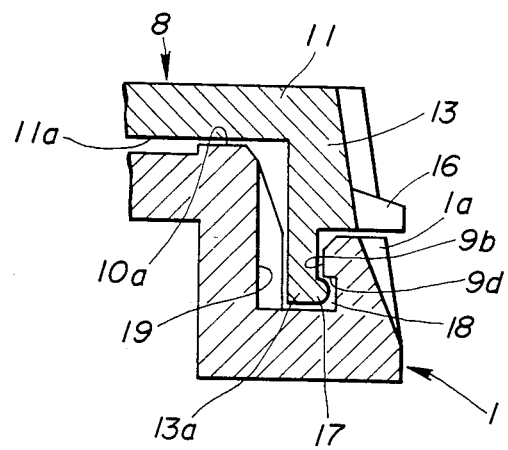
FIG. 5 is a cross-sectional view taken along the line of FIG. 2, in which the cover is mounted on the main body.

With such construction of the main body 1 and the cover 8 described above, mounting the cover 8 on the main body 1 is conducted as follows: firstly, as shown in FIG. 3, projections 14 of the cover 8 are inserted into the holes 15 of the main body 1, and then as shown in FIG. 4, the side wall 13 of the cover 8 is inserted into a groove between the side wall 10b of the base portion 10 and the side wall 9b of the concave portion 9 while the nail 17 of the cover 8 is inserted into the recess 18 of the main body 1 as shown in FIG. 5. When the cover 8 is mounted on the main body 1, the back surface 11a of the ceiling 11 of cover 8 is supported by the abutting surface 10a of the base portion 10.

Referring to FIGS. 3 to 5, the cover 8 is prevented from moving upward by means of an upper wall 9c of a recess 15 and an upper wall 9d of the recess 18. Further, the cover 8 is prevented from moving horizontally in a direction of arrow A in FIG. 2 by means of the side wall 10b of the base portion 10 and the side wall 9b of the concave portion 9. Also, the cover 8 is prevented from moving in the other horizontal direction by the walls 21 of the concave portion 9 of the main body 1 (see FIG. 2).

In this embodiment, a means for positioning the cover 8 is constructed by a groove formed between the side wall 10b of the base portion 10 and the side wall 9b of the concave portion 9, and the side wall 13 of the cover 8 which is inserted into the groove. However, this means is not restricted to the above construction only. It can be also constructed, for example, by a concave portion provided in the back surface 11a of the ceiling 11 of the cover 8 and a projection provided in the base portion 10 of the main body 1. Further, any constructions may be adopted as far as one side of the cover 8 is positioned in the vicinity of the side wall 13.

In the above embodiment, the second engaging means for preventing the cover 8 from being separated from the abutting surface 10a is constructed by the nail 17 formed in the side wall 13 of the cover 8 and the recess 18 formed in the side wall 9b of the concave portion 9 into which the nail 17 is inserted with the use of the resiliency of the side wall 13 of the cover 8. However, the second engaging means is not limited to the above construction only. It can be also constructed by providing a tongue segment having a nail at one end in the main body 1, and by engaging the nail with the side wall 13 of the cover 8, under the effect of the resiliency of the tongue segment. Further, it may be constructed by providing a resilient engaging portion in the main body 1 and the cover 8, respectively.

Now description will be made on the second embodiment of the present invention by referring FIGS. 6 to 8, in which the functional aspect of the invention is particularly described.

Figure 6:
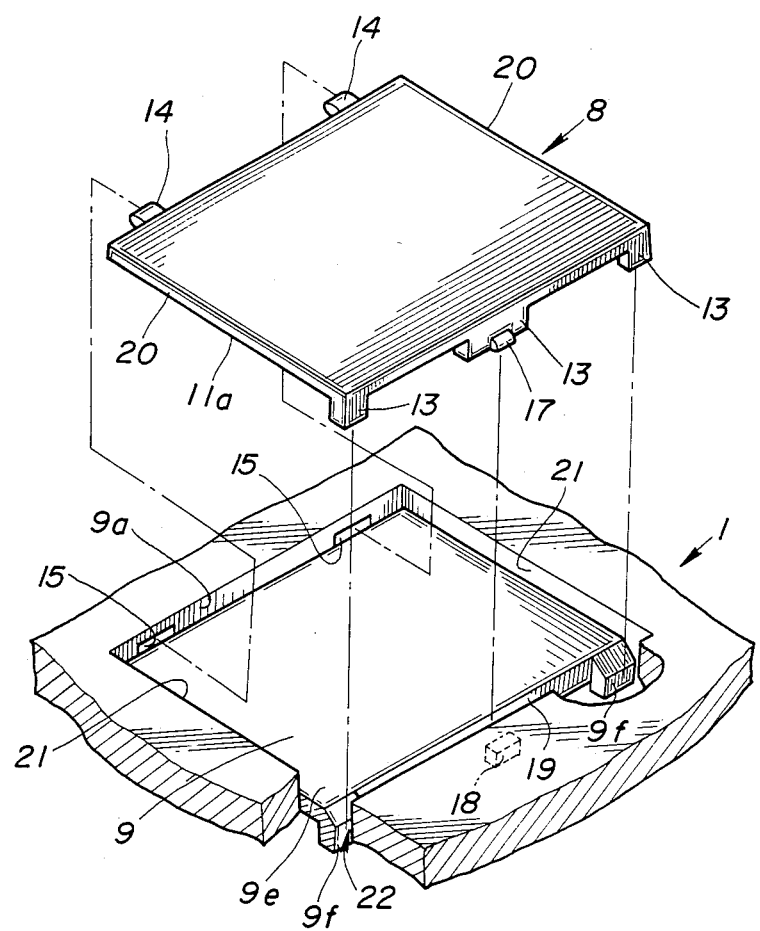
FIG. 6 is a schematical view of the essential part of the cover and the concave portion according to another embodiment of the present invention.
Figure 7:
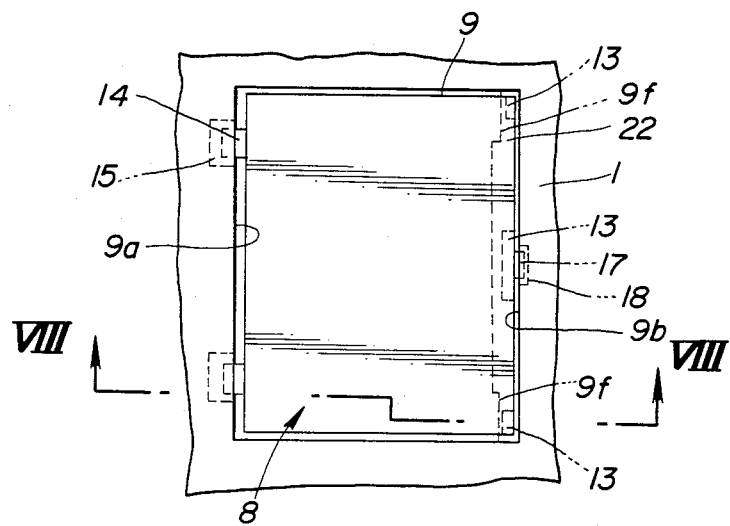
FIG. 7 is a plan view of the concave portion of FIG. 6 on which the cover is mounted.

FIG. 6 schematically shows the second embodiment in which the like elements are designated by the same reference numerals as in the first embodiment.

As shown in FIG. 6, this embodiment is not provided with the base portion 10 employed in the first embodiment. Instead, a groove 22 is formed in an end of the concave portion 9. In the groove 22, there is formed a side wall 9f for positioning the side wall 13 of the cover 8.

The cover 8 is mounted on the main body 1, firstly by inserting the projections 14 of the cover 8 into the recess 15 of the main body 1, and then the side wall 13 of the cover 8 is inserted into the groove 22 while the nail 17 of the cover 8 is inserted into the another recess 18 of the main body 1. The cover 8 thus mounted on the main body 1 is shown in FIG. 7.

Figure 8A:
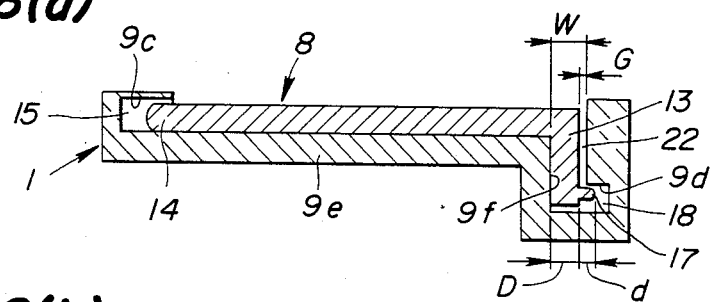
FIG. 8 is a cross-sectional view taken along the line VIII—VIII of FIG. 7.

The cover 8 thus mounted is positioned in its right and left directions by means of the groove 22 (width of the groove 22 is W) and the side wall 13 of the cover 8 (a thickness of the side wall 13 is D) as shown in FIG. 8(a). Upward movement of the cover 8 is prevented by the engagements between the projections 14 of the cover 8 and the upper walls 9c of the recess 15 of the main body 1 and between the nail 17 of the cover 8 (a projecting length of the nail 17 is d) and the upper wall 9d of the another recess 18 of the main body 1. The amount of insertion of the nail 17 of the cover 8 into the recess 18 of the main body 1 is expressed by D+d−W.

In this embodiment, even when the main body 1 and the cover 8 are made of different materials with different linear thermal expansion coefficient, it is possible to keep a steady engaging condition between the main body 1 and the cover 8 irrespective of the temperature variation, because of variation of gap G (=W−D) between the concave side wall 9b of the main body 1 and the side wall 13 of the cover 8 caused by the temperature variation is sufficiently small. Thus, the amount of the insertion length (D+d−W) can be substantially constant independent of the temperature variation.

Figure 8B:
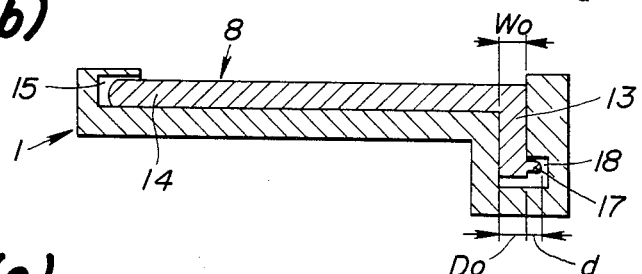
Figure 8C:
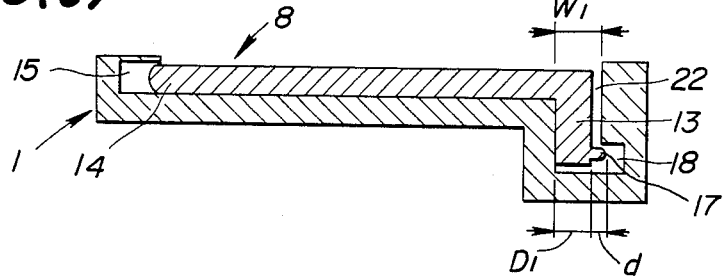

The minimum dimension of the height of the nail 17 is determined in consideration of the temperature variation. Now, it is assured that the linear expansion coefficient of the main body 1 is $\alpha$; the linear expansion coefficient of the cover 8 is $\beta(<\alpha)$; and the ambient operating temperature range is $t_0$ to $t_1$ °C. Further, assuming that FIG. 8(b) shows a condition in which the main body 1 and the cover 8 are under the lowest ambient operating temperature. (In this condition, it is supposed that $W_0 = D_0$) and FIG. 8(c) shows a condition in which the main body 1 and the cover 8 are under the maximum ambient operating temperature. (In this condition, it becomes that $W_1 \leq D_1 + d_1$). Then, an amount of d satisfying the above relations is given by the following equation:

$$0 \leq W_1 - D_1 = W_0(\alpha - \beta)(t_1 - t_0) \leq d \quad (1)$$

When the value d satisfies the equation (1), it is guaranteed that the cover 8 is firmly mounted on the main body 1 in a steady manner.

For example, when the ambient operating temperature range is from −20° to 60° C.; main body 1 is made of polystyrene resin (linear expansion coefficient $\alpha = 10.2 \times 10^{-5}/°C.$); the cover 8 is made of polycarbonate resin (its linear expansion coefficient $\beta = 5.4 \times 10^{-5}/°C.$); and both width $W_0$ of the groove 22 and thickness $D_0$ of the side wall 13 are 1.5 mm, then the equation (1) may be rewritten as follows:

$$0 \leq W_0(\alpha - \beta)(t_1 - t_0) = 1.5 \text{ mm} \times (10.2 - 5.4) \times 10^{-5}/°C. \times (60 + 20)°C. = 0.00576 \approx 0.006 \text{ mm} \leq d$$

As a result, the minimum necessary amount of the height d of the nail 17 is about 0.006 mm which is considerably small.

Incidentally, as shown in FIGS. 8(b) and 8(c), by enlarging the depth of the recess 15 and the length of the projections 14 inserted in the recess 15, the engagement between main body 1 and the cover 8 is not affected by the temperature variation.

The function of the present invention has been described with reference to the second embodiment. However, this function can also be made with reference to the first embodiment. Since these two embodiments are functionally same.

Although particular embodiments of the present invention has been described for illustrative purpose, it will be recognized that variations or modifications of the main body and its cover described including the rearrangement of their portions, lie within the scope of the present invention.

What is claimed is:

1. A case comprising:
   a cover;
   a main body of said case, said main body having a concave portion to which said cover is mounted;
   first engaging means for preventing one edge of said cover from moving away from one side wall of said concave portion;
   second engaging means for preventing another edge, of said cover opposing to said one edge from moving away from another side wall of said concave portion opposing to said one side wall; and
   positioning means for preventing, in the vicinity of said another side wall of said concave portion, said cover from moving toward said one side wall of said concave portion.

2. A case of claim 1, wherein said first engaging means is constructed by a recess formed at said one side wall of said concave portion and a projection formed at said one edge of said cover.

3. A case of claim 1, wherein said second engaging means is constructed by a recess formed at said another side wall of said concave portion and a projection formed at said another edge of said cover.

4. A case of claim 1, wherein said cover has a side wall at the enother edge thereof and said concave portion of the main body is formed with a groove for receiving said side wall of said cover at the bottom thereof along said another side wall of the concave portion, said side wall of the cover and said groove of the concave portion constituting said positioning means.

5. A case of claim 4, wherein said second engaging means is constructed by a projection formed at the outer face of said side wall of the cover and a recess formed at a side wall of said groove.

6. A case of claim 5, wherein said groove is formed with a recessed portion at a side wall thereof to which the inner face of said side wall of the cover opposes so as to allow elastic deformation of said side wall of the cover.

7. A case of claim 5, wherein said side wall of the cover is made thinner at a portion where said projection is formed.

* * * * *

UNITED STATES PATENT AND TRADEMARK OFFICE
CERTIFICATE OF CORRECTION

PATENT NO. : 4,616,764
DATED : October 14, 1986
INVENTOR(S) : Yoshihiro Utoh et al.

It is certified that error appears in the above-identified patent and that said Letters Patent is hereby corrected as shown below:

On the cover page, please change [73] to read as follows:
-- Kabushiki Kaisha Toshiba and Tokai Communication Industry Co. Ltd., Kawasaki-shi, Japan and Tokyo, Japan, Signed and Sealed this Twenty-fifth Day of October, 1988

*Attest:*

DONALD J. QUIGG

*Attesting Officer*     *Commissioner of Patents and Trademarks*